United States Patent [19]
DiFrancisco et al.

[11] Patent Number: 5,856,786
[45] Date of Patent: Jan. 5, 1999

[54] ADAPTIVE SLEEP CIRCUIT USING NETWORK TIMING FEEDBACK

[75] Inventors: Louis R. DiFrancisco, Palatine; Scott A. Stratmoen, Arlington; Michael James Trainor, Palatine, all of Ill.

[73] Assignee: Northrop Grumman Corporation, Los Angeles, Calif.

[21] Appl. No.: 812,719

[22] Filed: Mar. 5, 1997

[51] Int. Cl.$^6$ .................................................. G08B 21/00
[52] U.S. Cl. .......................... 340/635; 340/540; 371/5.1; 371/5.4
[58] Field of Search ..................................... 340/635, 640; 395/750.03, 750.05, 750.02; 364/707; 371/5.1, 5.4

[56] References Cited

U.S. PATENT DOCUMENTS 5,566,340 10/1996 Stewart et al. ........................... 395/750
5,602,859 2/1997 Kachi ..................................... 371/47.1

*Primary Examiner*—Jeffery Hofsass
*Assistant Examiner*—Julie B. Lieu
*Attorney, Agent, or Firm*—Terry J. Anderson; Karl J. Hoch, Jr.

[57] ABSTRACT

A method is disclosed for controlling operation of a battery powered modem to implement power conservation by adaptive modem sleep. The method comprises detecting the presence of a periodic network timing signal and detecting transition of the modem processor to a processing ready condition, wherein received RF signals can be processed. A processor ready signal is generated in response to detection of the processing ready condition and compared in time to occurrence of the network timing signal. A sleep error signal is generated which represents the interval between occurrence of the network timing signal and the processor ready signal. A modem is then directed into a sleep mode for periods of time sufficient to reduce the sleep error signal to be within a predetermined error budget.

7 Claims, 3 Drawing Sheets

ADAPTIVE SLEEP CIRCUIT USING NETWORK TIMING FEEDBACK

FIELD OF THE INVENTION

The present invention relates to electronic circuits of the type used to control the operation of a battery-powered, radio frequency modems. More particularly, the invention relates to an adaptive sleep circuit used to regulate power conditions of the modems to conserve power and preserve battery life.

BACKGROUND OF THE INVENTION

Commercial applications for battery-powered, radio frequency modems continue to expand at a substantial rate. Consumer demand for such battery-powered modems results in part from the propagation of battery powered computers and the increased availability of cellular telephone services. The propagation of battery-powered personal computers has resulted in dramatic changes with respect to where, when, and how computer related work projects can be done. Similarly, the growth of the cellular telephone industry has freed users telephone from the constraints of fixed site facilities. Battery-powered, radio frequency modems constitute another substantial technical step in the development of a portable, computer work stations that can be in voice and/or data communication with facilities anywhere in the world.

One of the well-known constraints in the operation of portable computers and cellular telephones relates to the expected life of the battery used to power the device. Once battery power is lost, the device becomes useless until recharged or connected to another power source. Consequently, users of such devices commonly carry extra batteries and/or purchase expensive long life batteries. Portable, radio-frequency modems face similar operating constraints resulting from power requirements. Consequently, a need has arisen to develop techniques for preserving battery life as much as possible.

Power conservation techniques are limited by several interrelated factors. Principal among those factors are cost, power consumption related to the conservation techniques themselves, and the time during which power may be conserved. Ideally, power consumption would be provided by a low-cost circuit, which itself consumes little energy, and can be left in a stand-by or off condition except during limited operational periods. Conventional power conservation circuits have significant limitations in their ability to achieve that combination of goals. For example, crystal oscillator circuits provide high precision, which allows the stand-by time to be minimized. However, crystal oscillator circuits suffer from drawbacks associated with both the cost and increased power consumption when in the stand-by condition.

By comparison, RC oscillator circuits are substantially less expensive than crystal oscillator circuits, and consume less power during stand-by condition. However, RC oscillator circuits do not typically achieve the precision available from crystal oscillator circuits. Consequently, RC oscillator circuits need to be in a powered condition for a longer period to assure the power is available the precise time that it is required.

The present invention is directed to apparatus and technique for optimizing power conservation in a low-cost RC oscillator circuit. The present invention takes advantage of the low cost and low power consumption of RC oscillator circuits, while providing a technique for enhancing the precision of the RC oscillator circuit by adaptive calibration to a network timing signal. The adaptive calibration allows adjustment of the stand by or "sleep" cycle of the modem to accommodate static and/or dynamic delays or inaccuracies in the RC oscillator, power circuitry, and network timing. The invention, therefore, permits the implementation of a low-cost, radio-frequency modem having extended battery life and reliable operation.

SUMMARY OF THE INVENTION

A method is disclosed for controlling operation of a battery powered modem to implement power conservation by adaptive modem sleep. The method comprises detecting the presence of a periodic network timing signal and detecting transition of the modem processor to a processing ready condition, wherein received RF signals can be processed. A processor ready signal is generated in response to detection of the processing ready condition and compared in time to occurrence of the network timing signal. A sleep error signal is generated which represents the interval between occurrence of the network timing signal and the processor ready signal. A modem is then directed into a sleep mode for periods of time sufficient to reduce the sleep error signal to be within a predetermined error budget.

The step of directing the modem into a sleep condition typically comprises adjusting the time at which the power is provided to the processor until the sleep error signal approaches zero. Further, the adjustment encompasses adjusting the time at which the power is provided to the processor such that the processor reaches a processing ready condition in advance of occurrence of the periodic network timing signal.

Preferably, the step of direction the modem into a sleep condition comprises adjusting the time at which power is provided to the processor until the processor error signal is less than 50 milliseconds.

In the preferred embodiment, the step of adjusting the time at which power is provided into the processor is implemented in steps, dependent upon the magnitude of the error period. As the error period decreases, the adjustment is effected by a progressively greater percentage of the error period.

DETAILED DESCRIPTION OF THE PREFERRED EMBODIMENT

Figure 1:
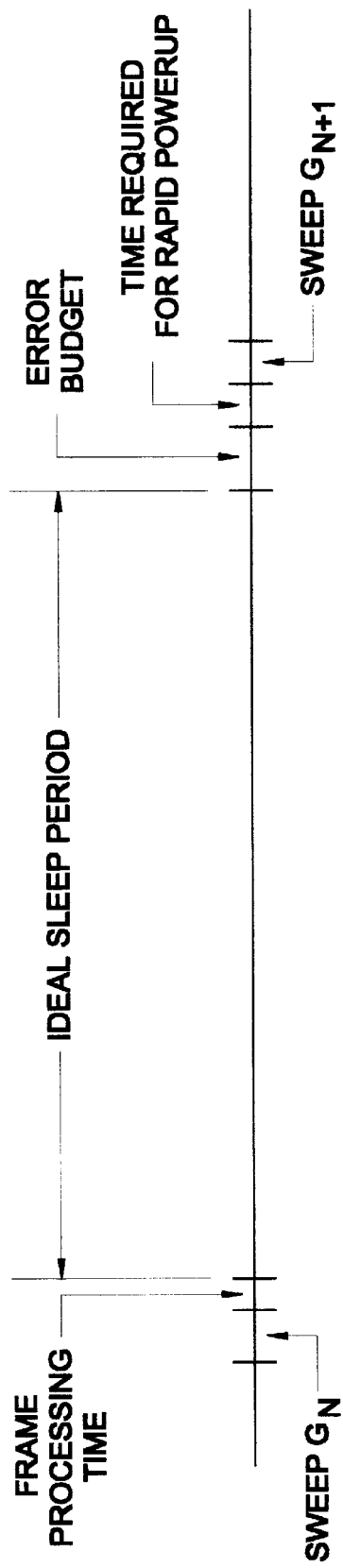
FIG. 1 is a timing diagram illustrating conditions of the modem in relation to a network timing cycle.

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiments. It is to be understood, however, that the same or equivalent functions may be accomplished by different embodiments that are also intended to be encompassed within the spirit and scope of the invention.

As described in more detail below, a low cost, low power RC oscillator circuit is provided to wake up a radio modem processor in time to receive required network packets, using an algorithm that adapts to the inaccuracies to the RC oscillator and network timing. Battery powered radio modems can save a great deal of battery life by not continually powering the receiver of the radio modem. Some radio modem protocols (e.g., Mobitex) have defined radio modem operating modes geared toward this type of operation. The amount of battery charge saved depends directly upon the time wasted by waking the processor early and having the processor idle while waiting for the necessary network packet. The battery charge saved also depends upon the power consumed while in the sleep state. Thus, there would typically exist a tradeoff between the power wasted by the timing inaccuracy of a low-power sleep mode (such as an RC oscillator solution), and the power wasted by higher precision, higher power consuming circuits (such as crystal oscillator circuits). The adaptive sleep solution described herein provides a low-cost solution that provides the low-power sleep using an RC oscillator without the power consumption due to timing accuracy.

During battery savings mode, a Mobitex packet data radio modem is required to turn on the radio to receive periodic network packets, known as Sweep 6 packets, which indicate to modems that there are incoming messages for them. These Sweep 6 packets are typically transmitted by the base station every ten seconds. Ideally, the radio modem would receive a Sleep 6 packets and then go into its lowest power modem and awaken in time to receive the next "Sweep 6" packet.

The adaptive sleep technique disclosed herein uses an RC oscillator with a nominal sleep time of 9.75 seconds, where a Sweep 6 packet occurs every 10 seconds. During the long sleep period, the processor sleeps, then wakes up, turns on the radio, and waits for a weep 6 packet. The processor then calculates how much time that the processor "overslept" or "underslept" by examining the time between when the processor reached a processing ready condition and the leading edge of the next Sweep 6 packet.

The amount of time that the processor underslept or overslept is considered the next time that the processor is to sleep. If this is the first time that the processor is to sleep, or if the last sleep error is so excessive and so is considered an aberration, the sleep error is reset. If the period that the processor is to sleep, time is much shorter than the normal inter-frame sleep time (typically because of processing performed during the inter-frame period), the last error is not considered. If the processor underslept, by more than a predetermined error budget, the RC time intervals sleep count will be incremented, e.g., by a fraction of the number of RC sleep time intervals determined by the difference between the ideal sleep time and the measured sleep time. If the processor overslept at all, the RC times sleep count will be decremented, e.g., by a fraction of the number of RC sleep time intervals between the ideal sleep time and the measured sleep time.

In the presently preferred embodiment, processor oversleep errors are weighted more heavily than processor undersleep errors because the processor would have to remain awake for the full inter-frame time to receive the next sweep 6 packet. Smaller errors are weighted more heavily than larger errors because, as the modem converges on the correct sleep period adaptation value, the larger sleep errors are likely to be measurement noise and, if weighted too heavily, may result in large, actual sleep period errors.

FIG. 1 is a timing diagram illustrating conditions of the modem in relation to a network timing signal. The diagram illustrates the current and duration of sweep 6 signals, identified as sweep $6_n$ and sweep $6_{n+1}$. Ideally, the modem circuity will remain off for as long as possible during the period between successive Sweep 6 signals. However, the modem cannot remain off during the entire interval due to processing requirements that continue after the sweep 6 signal, and the inherent power up time that must be accommodated before the arrival of the sweep 6 signal. To provide a margin for errors resulting from variances and circuit operation and the network timing signal, the processor is turned on, in advance of the sweep 6 signal, for a period corresponding to a predetermined error budget. As described in more detail below, the present technique provides for adaptively maximizing a processor sleep period beyond the aforementioned constraints.

Figure 2:
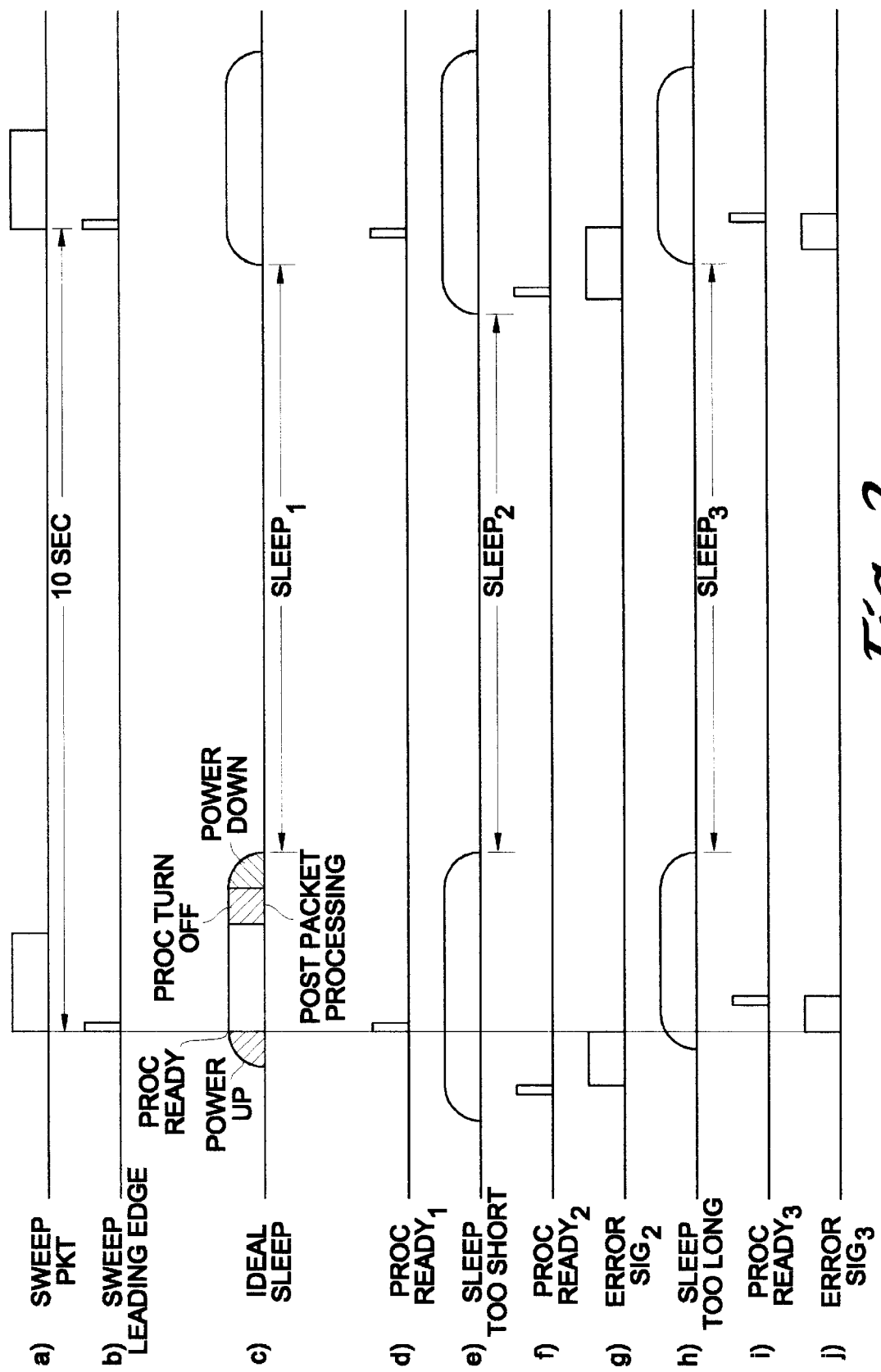
FIGS. 2(a–j) are further timing diagrams illustrating operating conditions of the modem in relation to sleep cycles of different lengths.

FIGS. 2((a)–(j) are further timing diagrams illustrating different operating conditions of the modem in relation to sleep cycles of different lengths. FIG. 2(a) illustrates the occurrence of a periodic sweep packet signal. In the presently preferred embodiment, the sweep packet signal occurs approximately every ten (10) seconds. FIG. 2(b) illustrates occurrence of the sweep packet leading edge signal, which is triggered by the leading edge of the sweep packet signal.

FIG. 2(c) illustrates power conditions of the processor under circumstances where the sleep period is idealized such that the processor reaches processing ready condition simultaneously with the leading edge of the sweep packet signal. Cross hatching is provided in the region corresponding to power up condition which occurs in the interval between when power is first applied to the processor and when the processor reaches a processing ready condition. Post packet processing occurs during an interval immediately following termination of the sweep packet signal. Upon termination of the post packet processing, the processor is turned off, followed by a period of power down, until the processor reaches a sleep mode. The sleep mode terminates as power is again applied to power up the processor.

FIG. 2(d) illustrates the occurrence of a processor ready signal that is generated after the processor has been powered up and is in a condition to begin processing the received sweep packet signal. In the circumstances illustrated in FIGS. 2(c) and (d), the processor ready signal occurs simultaneously with the sweep leading edge signal, consequently no error correction is required.

FIG. 2(e)–(g) illustrate circumstances where the sleep period is too short. As can be seen in connection with FIGS. 2(e), (f), and (g), the processor ready signal is generated in advance of the sweep leading edge signal. By comparing the occurrence of the processor ready$_2$ signal and the sweep leading edge signal, an error signal$_2$ is derived. The error signal$_2$, or some signal derived therefrom, is used to increment the sleep counter such that the processor ready signal will be delayed until a time closer to the occurrence of the sweep packet leading edge signal. As noted above, in the presently preferred embodiment, the processor ready signal is not adjusted to be coincident with the occurrence of the sweep leading edge signal, but rather is adjusted to occur a short period before the occurrence of the sweep leading edge signal. As noted above, that short period is referred to as the error budget. In the presently preferred embodiment, the error budget is approximately 50 milliseconds. The duration of the sweep packet is preferably 80 milliseconds and the combined power up/power down period is approximately 120 milliseconds. Accordingly, given a sweep packet signal having a period of 10 seconds, the processor sleep mode will extend for 9.75 seconds.

FIG. 2(h)–(j) illustrate circumstances wherein the processor sleep mode is too long. Under those circumstances, the processor ready$_3$ signal is generated after the occurrence of the sweep leading edge signal, resulting in the generation of error signal$_3$. Upon detection of those conditions, the sleep mode interval will be decremented such that the processor ready$_3$ signal will occur at the time of or shortly before the occurrence of the sweep leading edge signal.

Figure 3:
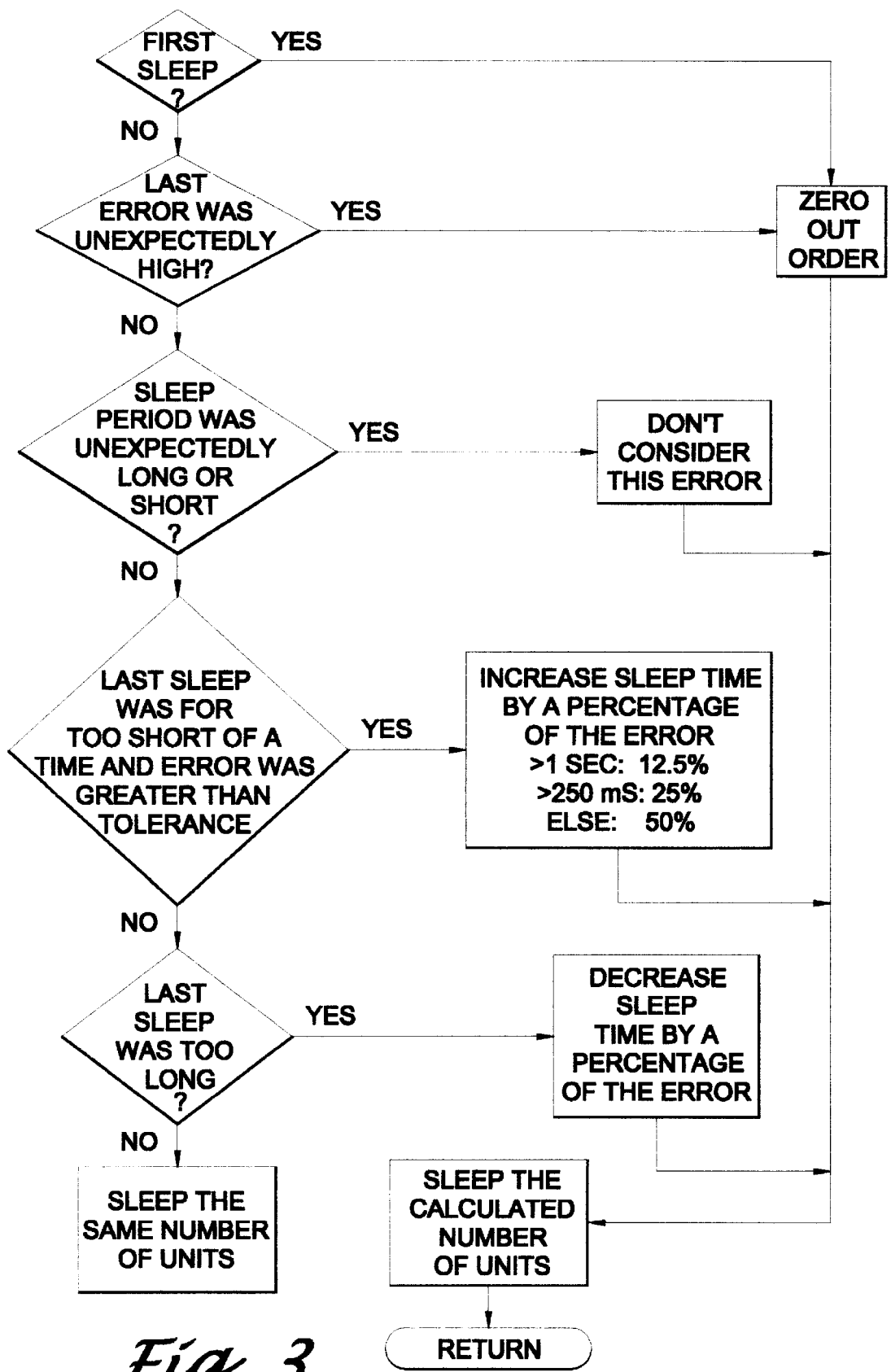
FIG. 3 is a logic diagram illustrating processing steps to adjust the sleep cycle of the modem to optimize power conservation.

FIG. 3 is a logic diagram illustrating the processing steps used to adjust the sleep mode of the modem to optimize power conservation. The processing steps illustrated therein demonstrate the manner in which the processor sleep time is incremented or decremented to provide optimal power conservation for the particular circuitry and network timing conditions. As noted in FIG. 3, the processing logic determines whether or not the sleep period is the first such period. If so, a resulting error signal is zeroed out. The processor then determines whether or not any resulting error signal was unexpectedly high. If so, the error is assumed to be an aberration and is again zeroed out. If the error was not expectedly high, a determination is made as to whether or not the sleep period was unexpectedly long or short. If so, the error is considered an aberration and is not given further consideration.

If the error was not expectedly high, and the sleep period was not unexpectedly long or short, the processor functions to evaluate whether the sleep period was too short or too long, and by how much of an increment. If the sleep was too short of a time, and the error was greater than the error budget, the processor operates to increment the sleep time by a percentage of the error period. Where the error is greater than one second, the processor increments the sleep time by 12.5% of the error period. Where the error is less than one second, but greater than 250 milliseconds, the processor operates to increment the sleep time by 25% of the error period. If the error is less than 250 milliseconds, the processor operates to increment the sleep time by 50% of the error period.

If the sleep time was too long, the processor operates to decrement the sleep time by a percentage of the error period. Once again, the percentage varies dependent upon the error period, i.e., the interval between the occurrence of the processor ready signal and occurrence of the sweep packet leading edge signal. Where the error interval was more than one second, the sleep time is decremented by 12.5% of the error. Where the error is less than one second, but more than 250 milliseconds, the sleep time is decremented by 25% of the error. If the error is less than 250 milliseconds, the sleep time is decremented by 50% of the error.

Where the sleep time was neither too long nor beyond tolerance of too short, the processor functions to repeat the same sleep interval in relation to the receipt of succeeding sweep packet signals. Where the sleep time was too long, or too short beyond tolerance, the processor increments or decrements sleep time, as described above, in relation to the succeeding sweep packet signal.

It is understood that the exemplary RC oscillator circuits described herein and shown in the drawings represent only preferred embodiments of the invention. Indeed, various modifications and additions may be made to such embodiments without departing from the spirit and scope of the invention.

What is claimed is:

1. A method of controlling operation of a battery-powered modem to implement adaptive modem sleep, the method comprising:
   a) detecting the presence of a periodic network timing signal;
   b) detecting transition of a modem processor to a processing ready condition wherein received RF signals can be processed;
   c) generating a processor ready signal in response to detection of the processing ready condition;
   d) comparing the occurrence of the network timing signal and occurrence of the processor ready signal;
   e) generating a sleep error signal representative of the interval between occurrence of the network timing signal and occurrence of the processor ready signal; and
   f) directing the modem into a sleep condition for a period of time sufficient to reduce the sleep error signal to a predetermined error budget.

2. The method as recited in claim 1 wherein the step of directing the modem into a sleep condition comprises adjusting the time at which power is provided to the processor until the sleep error signal approaches zero.

3. The method as recited in claim 1 wherein the step of directing the modem into a sleep condition comprises adjusting the time at which power is provided to the processor until the sleep error signal is less than fifty (50) milliseconds.

4. The method as recited in claim 1 wherein the step of comparing the occurrence of the network timing signal to the occurrence of the processor ready signal comprises detecting the occurrence of the processor ready signal before the occurrence of the network timing signal.

5. The method as recited in claim 4 wherein the step of directing the modem into a sleep condition comprises delaying the time at which power is provided to the processor by a time corresponding to a portion of the interval between occurrence of the network timing signal and occurrence of the processor ready signal.

6. The method as recited in claim 1 wherein the step of comparing the occurrence of the network timing signal to the processor ready signal comprises detecting the occurrence of the processor ready signal after the occurrence of the network timing signal.

7. The method as recited in claim 6 wherein the step of directing the modem into a sleep condition comprises advancing the time at which power is provided to the processor by a time corresponding to a portion of the interval between occurrence of the network timing signal and occurrence of the processor ready signal.

* * * * *